(12) United States Patent
Kusachi et al.

(10) Patent No.: US 7,662,519 B2
(45) Date of Patent: *Feb. 16, 2010

(54) NON-AQUEOUS ELECTROLYTE SECONDARY BATTERY

(75) Inventors: Yuki Kusachi, Tokyo (JP); Koji Utsugi, Tokyo (JP)

(73) Assignee: NEC Corporation (JP)

( * ) Notice: Subject to any disclaimer, the term of this patent is extended or adjusted under 35 U.S.C. 154(b) by 512 days.

This patent is subject to a terminal disclaimer.

(21) Appl. No.: 10/557,029

(22) PCT Filed: Aug. 11, 2004

(86) PCT No.: PCT/JP2004/011534

§ 371 (c)(1),
(2), (4) Date: Sep. 20, 2006

(87) PCT Pub. No.: WO2005/029613

PCT Pub. Date: Mar. 31, 2005

(65) Prior Publication Data

US 2007/0054179 A1 Mar. 8, 2007

(30) Foreign Application Priority Data

Sep. 16, 2003 (JP) .............................. 2003-322968

(51) Int. Cl.
- H01M 6/16 (2006.01)
- H01M 6/14 (2006.01)
- H01G 9/22 (2006.01)
- H01G 9/28 (2006.01)

(52) U.S. Cl. ..................... 429/340; 429/329; 429/330; 429/199; 252/62.2

(58) Field of Classification Search ......... 429/199–200, 429/231.1, 231.4, 231.8–231.95, 326–331, 429/336–338, 340–343; 252/62.2; 29/623.1–623.5
See application file for complete search history.

(56) References Cited

U.S. PATENT DOCUMENTS

| 4,950,768 | A |   | 8/1990 | Cronyn |          |
|-----------|---|---|--------|--------|----------|
| 6,033,809 | A | * | 3/2000 | Hamamoto et al. | 429/340 |
| 6,994,936 | B2 | * | 2/2006 | Mori | 429/340 |
| 7,163,768 | B2 | * | 1/2007 | Utsugi et al. | 429/340 |

FOREIGN PATENT DOCUMENTS

| DE | 2233859 |   | 1/1974 |
|----|---------|---|--------|
| DE | 2509738 |   | 9/1976 |
| JP | 5-44946 |   | 1/1979 |
| JP | 62-1000948 |   | 5/1987 |
| JP | 63-102173 |   | 5/1988 |
| JP | 05-234583 |   | 9/1993 |
| JP | 05-275077 |   | 10/1993 |
| JP | 06-132031 |   | 5/1994 |
| JP | 07-302617 |   | 11/1995 |
| JP | 08-250108 |   | 9/1996 |
| JP | 10-050342 |   | 2/1998 |
| JP | 10-189041 |   | 7/1998 |
| JP | 11-288706 |   | 10/1999 |
| JP | 11-339850 |   | 12/1999 |
| JP | 2000-003724 |   | 1/2000 |
| JP | 2000-123880 |   | 4/2000 |
| JP | 2000-133304 |   | 5/2000 |
| JP | 2000-235866 |   | 8/2000 |
| JP | 2000-294278 |   | 10/2000 |
| JP | 2000-323124 |   | 11/2000 |
| JP | 2001-126764 |   | 5/2001 |
| JP | 2001-313071 |   | 11/2001 |
| JP | 2002008718 | A * | 1/2002 |
| JP | 2002-093405 |   | 3/2002 |
| JP | 2002-324550 |   | 11/2002 |
| JP | 2002-343426 |   | 11/2002 |
| JP | 2004-055502 |   | 2/2004 |
| JP | 2004-281368 |   | 10/2004 |
| WO | WO 85/03075 | A * | 7/1985 |
| WO | WO 02/082569 |   | 10/2002 |

OTHER PUBLICATIONS

Abstract in English of JP 2002-008718.*
Naoi et al., The 68th Conference of Electrochemical Society of Japan (Sep. 2000; Chiba Institute of Technology; Lecture No. 2A24.
Naoi et al., The 41st Battery Symposium in Japan (Nov. 2000; Nagoya Congress Center; Lecture No. 1E03.

* cited by examiner

*Primary Examiner*—Dah-Wei D Yuan
*Assistant Examiner*—Claire L Rademaker
(74) *Attorney, Agent, or Firm*—Dickstein, Shapiro, LLP.

(57) ABSTRACT

The present invention provides a non-aqueous electrolyte secondary battery having excellent properties such as energy density and electromotive force and being excellent in cycle life, storage property and safety. In the present invention, the non-aqueous electrolyte secondary battery comprises a substance having a peak from 162.9 to 164.0 eV by XPS analysis on the anode surface.

10 Claims, 1 Drawing Sheet

Fig. 1

NON-AQUEOUS ELECTROLYTE SECONDARY BATTERY

TECHNICAL FIELD

The present invention relates to an electrolyte for a secondary battery and a secondary battery using the same.

BACKGROUND ART

A non-aqueous electrolyte lithium ion or lithium secondary battery using a carbon material, an oxide, lithium alloy or lithium metal as an anode is attracting attention as a power source for a mobile phone, a notebook computer and so on because of a high energy density realized thereby.

In this secondary battery, a film referred to as a surface film, a protection film, SEI (Solid Electrolyte Interface), a coating film or the like (hereinafter referred to as "surface film") is known to be formed on the anode surface. The control of the surface film was known to be indispensable for providing higher performance in the anode because the surface film largely affects a charge/discharge efficiency, a cycle life, etc. The reduction of irreversible capacity is desired in the carbon material and the oxide material, and suppression of the reduction of the charge/discharge efficiency and formation of dendrite (branch-like crystal) is desired in the lithium metal or alloy anode.

A variety of techniques have been proposed for solving these problems. For example, suppression of the formation of dendrite by forming a coating layer consisted of lithium fluoride or the like on the surface of the lithium metal or lithium alloy by utilizing a chemical reaction has been proposed.

Patent Document 1 discloses a technique in which the lithium anode is exposed to an electrolyte containing hydrofluoric acid to react the anode with hydrofluoric acid thereby covering the surface thereof with a lithium fluoride film. The hydrofluoric acid is generated by the reaction between $LiPF_6$ and a slight amount of water. In the meantime, lithium hydroxide or lithium oxide is formed on the surface of the lithium anode through natural oxidation in air. The reaction between them produces a lithium fluoride surface film on the anode surface. However, this lithium fluoride film is formed by the reaction between the electrode interface and the liquid and is liable to be contaminated with a side-reaction component in the surface film and a homogeneous film is hardly obtained. There may be cases where the surface film such as lithium hydroxide and lithium oxide is not homogeneously formed or a part of the lithium is exposed as it is, and in these cases, not only the formation of a homogeneous thin film is difficult but also measure against the reaction between water or hydrogen fluoride and lithium may be required. When the reaction is insufficient, unnecessary compound ingredients other than fluoride may remain and cause disadvantages such as reduction of ionic conductivity. Further, in the method of forming a fluoride layer by utilizing such a chemical reaction on the interface as this, selection range of usable fluoride and electrolyte is restricted and there is a case where a stable surface film can be hardly formed with a good yield.

In Patent Document 2, a mixed gas of argon and hydrogen fluoride and aluminum-lithium alloy are reacted and a surface film made of lithium fluoride is obtained on the anode surface. However, when a surface film is present on the lithium metal surface in advance, especially when a plurality of compounds exist, the reaction is likely to be heterogeneous and may be difficult to homogeneously form a lithium fluoride film. Accordingly, obtaining a lithium secondary battery with excellent cycle performance may be difficult.

Patent Document 3 discloses a technique in which a surface coating film structure having a sodium chloride crystalline structure component as a main component is formed on the surface of a lithium sheet having a homogeneous crystalline structure, that is, preferentially oriented a (100) crystalline plane. By doing this, a homogeneous depositing and dissolving reaction, that is, charge and discharge of the battery, can be allegedly performed, the dendrite deposition of the lithium metal is suppressed and the cycle life of the battery is improved. It is described that the material used for the surface film has preferably a halide of lithium and that a solid solution consisting of at least one compound selected from LiCl, LiBr and LiI, and LiF is preferably used. Specifically, in order to produce the solid solution coating film consisting of at least one compound selected from LiCl, LiBr and LiI, and LiF, an anode for a non-aqueous electrolyte battery is fabricated by dipping a lithium sheet having the preferentially oriented (100) crystalline plane prepared by pressing (rolling) into an electrolyte containing at least one of a chlorine molecule or chlorine ion, a bromine molecule or bromine ion and an iodine molecule or iodine ion, and a fluorine molecule or fluorine ion. In this technique, a rolled lithium metal sheet is used and the lithium sheet is likely to be exposed to atmospheric air, and accordingly, a film originating from moisture tends to be formed on the surface which makes the existence of active points heterogeneous, and therefore, fabricating the intended stable surface film may be difficult so that the effect of suppressing the formation of dendrite cannot be necessarily and sufficiently attained.

Further, Naoi et al., reported the effect of a complex between a lanthanoid transition metal such as europium and an imide anion on the lithium metal anode in the academic presentation at the 68th Conference of Electrochemical Society of Japan (September, 2000; Chiba Institute of Technology; Lecture No.: 2A24) and the 41st Battery Symposium in Japan (November, 2000; Nagoya Congress Center; Lecture No. 1E03). Here, $Eu(CF_3SO_3)_3$ was further added as an additive to the electrolyte prepared by adding $LiN(C_2F_5SO_2)_2$ as a lithium salt to a mixed solvent of propylene carbonate or ethylene carbonate and 1,2-dimethoxyethane, and a surface film made of $Eu[(C_2F_5SO_2]_3$ complex is formed on the Li metal dipped in the electrolyte. This method has some certain effects on the improvement of the cycle life but further improvement is desired. In addition, because it is indispensable to use a comparatively expensive lithium imide salt such as $LiN(C_2F_5SO_2)_2$ as an electrolyte, and even if a lithium salt (for example, generally $LiPF_6$) other than this and a complex which consists of transition metal and $CF_3SO_3^-F_3S$ ion are added, a complex consisting of a transition metal and an imide anion is not formed and the cycle performance is not improved. Furthermore, when a lithium imide salt is used as an electrolyte, resistance of the electrolyte becomes higher as compared with a case where $LiPF_6$ etc. is used, and accordingly improvement is desired in that the internal resistance of a battery increases.

In addition, when a carbon material such as graphite and amorphous carbon which can occlude and release lithium ions is used as anode, a technique concerning the improvement in capacity and charge/discharge efficiency is reported.

Patent Document 4 proposes an anode comprising a carbon material covered with aluminum. This allegedly suppresses reduction decomposition of the solvent molecules which solvate lithium ion on the carbon surface and degradation of the cycle life. However, because aluminum may react with a slight amount of water, improvement is desired in that capacity decreases quickly when the cycle is repeated.

Patent Document 5 presents an anode in which the surface of a carbon material is covered with a thin film of a lithium ion conductive electrolyte. It is stated that the decomposition of the solvent produced when the carbon material is used is controlled by doing this, and a lithium-ion secondary battery in which propylene carbonate can be used can be especially provided. However, cracks produced in the solid electrolyte by the stress change at the time of insertion and release of lithium ions may cause degradation of properties. Further, homogeneous reaction on the anode surface may not be attained due to heterogeneity such as a crystal defect of the solid electrolyte, and may lead to degradation of the cycle life.

Patent Document 6 discloses a secondary battery having an anode consisted of a material containing graphite and comprising as the electrolyte a cyclic carbonate and a linear carbonate as the main ingredients and further containing 0.1 wt % to 4 wt % of 1,3-propanesultone and/or 1,4-butanesultone in the electrolyte. Here, it is considered that 1,3-propanesultone and 1,4-butanesultone contribute to the formation of passive film on the carbon material surface, cover an active and highly crystallized carbon material such as natural graphite and artificial graphite with a passive film and exhibit an effect of suppressing decomposition of the electrolyte without spoiling the normal reaction of the battery. However, no excellent effect is obtained in this method, and improvement is desired in that the electric charge due to decomposition of the solvent molecule and anion appears as an irreversible capacity component, which leads to decrease in the first time charging and discharging efficiency. Improvement is also desired in that resistance of the generated film ingredient is high, and especially increasing rate of resistance with the time course under a high temperature is large.

Patent Document 7 discloses a non-aqueous secondary battery having a cathode consisting of a 4 V class active material and an anode comprising a substance having peaks at 55.0 eV and 168.6 eV by XPS analysis on the surface. It is described here that the peak at 55.0 eV is assigned to a lithium sulfur compound and a peak at 168.6 eV forms a film having a $SO_2$ bond, and that although the film having a $SO_2$ bond is stable, it has ion conductivity and it has an action to suppress the decomposition of the electrolyte. However, improvement is desired in this method in that when stored at a high temperature, resistance increases and decrease of the output and deterioration in the capacity of the battery take place.

Patent Document 1: Japanese Patent Laid-Open No. 7-302617.
Patent Document 2: Japanese Patent Laid-Open No. 8-250108.
Patent Document 3: Japanese Patent Laid-Open No. 11-288706.
Patent Document 4: Japanese Patent Laid-Open No. 5-234583.
Patent Document 5: Japanese Patent Laid-Open No. 5-275077.
Patent Document 6: Japanese Patent Laid-Open No. 2000-3724.
Patent Document 7: Japanese Patent Laid-Open No. 2000-323124.

DISCLOSURE OF INVENTION

Problems to be Solved by the Invention

As mentioned above, it cannot be said that excellent coating film effect over improvement in the battery properties was obtained with the conventional techniques, and improvements have been desired in the following points.

Although the surface film generated on the anode surface is deeply involved with charge/discharge efficiency, cycle life, etc. in accordance with the properties thereof, there is no technique yet which enables excellent control on the film over a long period of time.

For example, when a surface film consisting of a lithium halide or a glass-like oxide is formed on the layer consisting of lithium or its alloy, although the effect of controlling dendrite is obtained to a certain extent at the time of initial use, as it is repeatedly used, there is caused a tendency that the surface film is degraded the function as a protection film is impaired. This is considered to be attributable to the cause that while the layer consisting of lithium or its alloy changes in volume as it occludes and releases lithium, the film consisting of a lithium halide etc. located thereon hardly changes in volume and therefore internal stress is resulted in these layers and the interface between these. It is considered that when such internal stress occurs, part of the surface films, especially those consisting of a lithium halide etc. are damaged, the function of controlling the dendrite is impaired.

In addition, as for carbon materials such as graphite, excellent coating film effect is not obtained and the electric charge by decomposition of solvent molecules or anions appears as an irreversible capacity component, and leads to decrease in the first time charge/discharge efficiency. Further, composition, crystal state, stability, etc. of the film formed at this time have a significant influence on the subsequent efficiency and the cycle life. Furthermore, decomposition of the solvent of the electrolyte has been promoted by a slight amount of moisture in the graphite or amorphous carbon anode. In such a case, when a graphite or amorphous carbon anode is used, it is necessary to also perform removal of water molecules.

Thus, although the coating film generated on the anode surface was deeply involved with charge/discharge efficiency, cycle life, etc. in accordance with the properties thereof, there is no technique yet which enables excellent control on the film over a long period of time and development of an electrolyte which forms a stable coating film leading to an excellent charge/discharge efficiency on the anode has been desired.

An object of the present invention is to provide an anode for secondary battery which enables the storage life of a secondary battery to be stable and excellent in view of the above-mentioned situation. Another object of the present invention is to provide a secondary battery which exhibits stability and excellent storage life and high charge/discharge efficiency.

Means for Solving the Problems

According to the present invention, a non-aqueous electrolyte secondary battery, comprising a substance having a peak from 162.9 to 164.0 eV by XPS analysis on the anode surface is obtained.

It is preferable in this secondary battery that when peak division of the photoelectron spectrum is performed by XPS analysis on the anode surface, the ratio (Cc/Cs) between the carbon concentration Cc (atom %) and the sulfur concentration Cs (atom %) is 5 to 50, and the ratio ($Cs_{164}$/Cs) between the sulfur concentration Cs (atom %) and the concentration $Cs_{164}$ (atom %) of the substance having a peak from 162.9 to 164.0 eV is 0.001 to 0.2.

It is preferable that the substance having a peak from 162.9 to 164.0 eV comprises a decomposed substance of a compound represented by the formula (1):

(1)

wherein Q represents an oxygen atom, a methylene group, or a C—S single bond; A represents a substituted or unsubstituted alkylene group having 1 to 5 carbon atoms, a carbonyl group, a sulfinyl group, a substituted or unsubstituted fluoroalkylene group having 1 to 6 carbon atoms, or a divalent group having 2 to 6 carbon atoms in which a plurality of alkylene units, a plurality of fluoroalkylene units or an alkylene unit and a fluoroalkylene unit are bonded through an ether bond; and B represents a substituted or unsubstituted alkylene group, a substituted or unsubstituted fluoroalkylene group; or an oxygen atom.

A non-aqueous electrolyte secondary battery wherein the electrolyte comprises an aprotic solvent and a cyclic disulfonic acid ester having at least two sulfonyl groups is preferable.

It is preferable that the cyclic disulfonic acid ester is a compound represented by the formula (1):

(1)

wherein Q represents an oxygen atom, a methylene group, or a C—S single bond; A represents a substituted or unsubstituted alkylene group having 1 to 5 carbon atoms, a carbonyl group, a sulfinyl group, a substituted or unsubstituted fluoroalkylene group having 1 to 6 carbon atoms, or a divalent group having 2 to 6 carbon atoms in which a plurality of alkylene units, a plurality of fluoroalkylene units or an alkylene unit and a fluoroalkylene unit are bonded through an ether bond; and B represents a substituted or unsubstituted alkylene group, a substituted or unsubstituted fluoroalkylene group; or an oxygen atom.

It is preferable that the electrolyte further comprises a sultone compound represented by the formula (2):

(2)

wherein n represents an integer of 0 to 2; and $R_1$ to $R_6$ each independently represent a hydrogen atom, an alkyl group having 1 to 12 carbon atoms, a cycloalkyl group having 3 to 6 carbon atoms, or an aryl group having 6 to 12 carbon atoms.

It is preferable that the electrolyte comprises 0.001 mol/L to 0.5 mol/L of the cyclic disulfonic acid ester.

It is preferable that the non-aqueous electrolyte secondary battery comprises a lithium-containing composite oxide as a cathode active material.

It is preferable that the non-aqueous electrolyte secondary battery comprises as an anode active material at least one substance selected from the group consisting of a material which can occlude and release lithium, and a metal material and an oxide material which can form an alloy with lithium.

It is preferable that the non-aqueous electrolyte secondary battery comprises a carbon material as an anode active material.

It is preferable that the carbon material is graphite.

It is preferable that the carbon material is amorphous carbon.

EFFECTS OF THE INVENTION

According to the present invention, a stable film having a high ion conductivity can be obtained on the anode surface. In addition, in the case where the cathode is an oxide which contains manganese, elusion of manganese can be suppressed and adhesion of the eluted manganese onto the anode can be also prevented. Therefore, a secondary battery which can improve storage properties and suppress increase in the resistance and has a stable and excellent storage life as well as high charge/discharge efficiency can be obtained.

DESCRIPTION OF THE SYMBOLS

11 Cathode current collector
12 Layer containing a cathode active material
13 Layer containing an anode active material
14 Anode current collector
15 Non-aqueous electrolyte
16 Porous separator

BEST MODE FOR CARRYING OUT THE INVENTION

A stable coating film having a high ion conductivity has been obtained on the anode surface by making a sulfur compound and sulfur which does not have oxygen in the first proximity having a peak observed from 162.9 to 164.0 eV by XPS analysis exist on the anode surface. In addition, in the case where the cathode is an oxide which contains manganese, elusion of manganese can be suppressed and adhesion of the eluted manganese onto the anode can be also prevented. Therefore, a secondary battery which can improve storage properties and suppress increase in the resistance and has a stable and excellent storage life as well as high charge/discharge efficiency can be obtained.

In a non-aqueous electrolyte secondary battery which has a non-aqueous electrolyte containing an aprotic solvent and a cyclic disulfonic acid ester having at least two sulfonyl groups, particularly a compound represented by the formula (1), the cyclic disulfonic acid ester, particularly the compound represented by the formula (1) contributes to the passive film formation in the electrode interface of a battery, and as a result, suppresses decomposition of a solvent molecule. In addition, in the case where the cathode is an oxide which contains manganese, elusion of manganese can be suppressed and adhesion of the eluted manganese onto the anode can be also prevented. Therefore, cycle performance of a secondary battery can be improved and increase in resistance can be suppressed by using such an electrolyte in a secondary battery through the effects of forming a coating film on the anode and being able to alleviate the influence on the elusion such as manganese.

(1)

In the formula (1), Q represents an oxygen atom, a methylene group, or a C—S single bond; A represents a substituted or unsubstituted alkylene group having 1 to 5 carbon atoms, a carbonyl group, a sulfinyl group, a substituted or unsubstituted fluoroalkylene group having 1 to 6 carbon atoms, or a divalent group having 2 to 6 carbon atoms in which a plurality of alkylene units, a plurality of fluoroalkylene units or an alkylene unit and a fluoroalkylene unit are bonded through an ether bond; and B represents a substituted or unsubstituted alkylene group, a substituted or unsubstituted fluoroalkylene group, or an oxygen atom.

Here, when Q represents a C—S single bond in the formula (1), C (carbon atom) in the C—S bond is a part of above A.

Such a secondary battery can be manufactured by a production method, for example, comprising steps of: dissolving a cyclic disulfonic acid ester, particularly a compound represented by the formula (1) in a solvent, dissolving a lithium salt in a solvent, and filling the battery with the solvent in which these are dissolved. When a step of charging and discharging the obtained secondary battery is performed, the cyclic disulfonic acid ester opens the ring by the reduction reaction and it is further reduced to cause a deoxidization reaction. Accordingly, a non-aqueous electrolyte secondary battery in which a substance having a peak from 162.9 to 164.0 eV when peak division of the sulfur spectrum is performed by XPS analysis exists on the above-mentioned anode surface can be readily and stably obtained.

[Structure]

Figure 1:
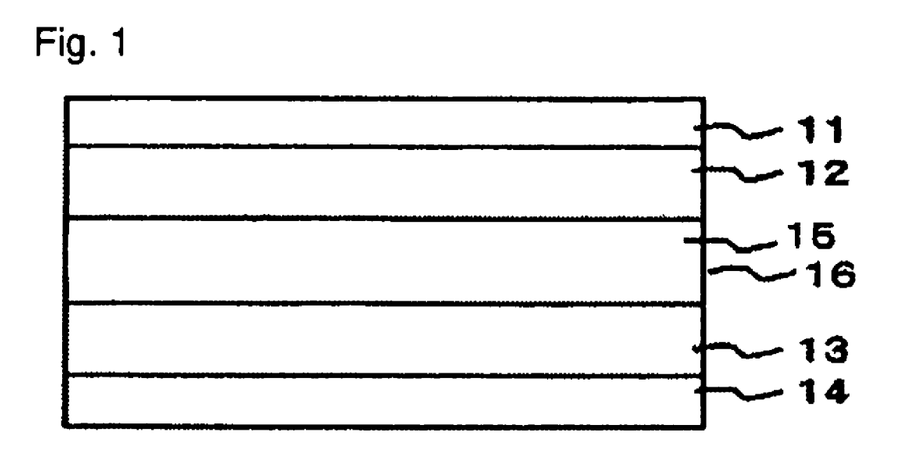
FIG. 1 is an outline of the construction of the secondary battery of the present invention.

The specific construction of the present invention will be described referring to the drawing hereinbelow. The battery of the present invention has a cathode, an anode, and a non-aqueous electrolyte as shown in FIG. 1. FIG. 1 is an outline expanded sectional view in the thickness direction of anode current collector of the secondary battery of the present invention. The cathode is formed by forming layer 12 containing a cathode active material as a film on cathode current collector 11. The anode is formed by forming layer 13 containing an anode active material as a film on anode current collector 14. These cathode and anode are positioned in an opposite arrangement through non-aqueous electrolyte 15 which is a non-aqueous electrolyte solution and porous separator 16 immersed in the electrolyte 15. Porous separator 16 is arranged almost parallel to layer 13 containing an anode active material. A coating film is formed in the interface of anode active material 13 and electrolyte 15, and when peak division of the photoelectron spectrum is performed by XPS analysis of the coating film and each peak is expressed in terms of atom %, it is preferable that the ratio $(Cs_{164}/Cs)$ between the sulfur concentration Cs and the concentration $Cs_{164}$ of sulfur which does not have oxygen in the first proximity is 0.001 to 0.2.

As XPS analysis (X ray photoelectron spectrum method; it is also referred to as ESCA.), "SSX-100" manufactured by U.S. SSI company is used, as X ray source is used single crystal spectrum AlKα ray, as X ray spot is used a 1000×1750 μm ellipse form with an output of 10 kV and 22 mA, as analyzer mode is used Constant Analyzer Energy (CAE) Mode, Wide Scan: Res.4=150 eV and Narrow scan: Res.2=50 eV of Pass Energy, as the geometry is used θ=35%, as the horizontal-axis compensation is used 284.6 eV for neutral carbon C1s, and as data processing such as peak division is used 3 points smoothing, peak area measurement, background subtraction and peak synthesis, to calculate atom % of each component, but measurement conditions equivalent to this are sufficient. As a pretreatment of measurement sample, the battery is discharged to 2.5 V by 0.1 C (when the battery of a certain capacity is made to discharge with a constant current and the discharge finishes in exactly 1 hour, the current is called 1 C.), and the measurement can be performed without exposing to the atmosphere by disassembling the battery in a glove box filled with argon gas and cutting out the anode.

In XPS analysis, a peak from 284 to 290 eV is a peak based on carbon, a peak from 161 to 171 eV is a peak based on sulfur, and a peak from 162.9 to 164.0 eV is a peak based on the sulfur in the state where there is no oxygen in the first proximity. It is preferable that when XPS analysis is carried out about the anode surface, peak division is performed and each peak is expressed with atom %, preferably the ratio (Cc/Cs) between the carbon concentration Cc (atom %) and the sulfur concentration Cs (atom %) is 5 to 50 and the ratio $(Cs_{164}/Cs)$ between the sulfur concentration Cs (atom %) and the concentration $Cs_{164}$ (atom %) of sulfur which does not have oxygen in the first proximity is 0.001 to 0.2, more preferably the ratio (Cc/Cs) between the carbon concentration and the sulfur concentration is 10 to 20 and the ratio $(Cs_{164}/Cs)$ between the sulfur concentration and the concentration of sulfur which does not have oxygen in the first proximity is 0.01 to 0.15. By making the ratio (Cc/Cs) between the carbon concentration and the sulfur concentration 5 or more, coating film formation is suitably performed, and by making the ratio 50 or less, the coating film can be prevented from being thick and having a high resistance.

[Production Method]

The cyclic disulfonic acid ester is dissolved in an electrolyte, the battery can be filled with the electrolyte, and the anode of the above-mentioned composition can be formed by performing charging and discharging. Although the ratio of the cyclic disulfonic acid ester occupying in the electrolyte is not particularly limited, it is preferable that 0.001 mol/L to 0.5 mol/L of it is contained in the electrolyte, and 0.05 mol/L to 0.2 mol/L is more preferable. By adjusting it in such a range, a stable and thin coating film having a low resistance can be formed over the whole anode surface.

Typical examples of the compound represented by the formula (1) are specifically illustrated in Tables 1 to 3, but the present invention is not limited to these.

TABLE 1

| Compound No. | Chemical Structure |
|---|---|
| 1 | 1,3,2-dioxathiane-based ring with two SO₂ groups and CH₂ bridge |
| 2 | Ring with two SO₂ groups and -(CH₂)₂- bridge |
| 3 | Ring with two SO₂ groups and -(CH₂)₃- bridge |
| 4 | Ring with two SO₂ groups, CH(CH₃) and -(CH₂)₂- bridge |
| 5 | Ring with two SO₂ groups, C(CH₃)₂ and CH₂ bridge |
| 6 | Ring with two SO₂ groups, CF₂ and CH₂ bridge |
| 7 | Ring with two SO₂ groups, CH₂ and C(CH₃)₂ bridge |
| 8 | Ring with two SO₂ groups, C(CH₃)₂ and C(CH₃)₂ bridge |
| 9 | Ring with two SO₂ groups, CH₂ and C=O bridge |
| 10 | Ring with two SO₂ groups, C(CH₃)₂ and C=O bridge |
| 11 | Ring with two SO₂ groups, CF₂ and C=O bridge |
| 12 | Ring with two SO₂ groups, CH₂ and S=O bridge |
| 13 | Ring with two SO₂ groups, C(CH₃)₂ and S=O bridge |
| 14 | Ring with two SO₂ groups, CF₂ and S=O bridge |
| 15 | Ring with two SO₂ groups, CH₂ and CF₂ bridge |
| 16 | Ring with two SO₂ groups, CH₂ and -(CF₂)₂- bridge |
| 17 | Ring with two SO₂ groups, CH₂ and -CH₂-CF₂-CH₂- bridge |
| 18 | Ring with two SO₂ groups, CH₂ and -CH₂-O-CH₂-O-CH₂- bridge |

TABLE 1-continued

| Compound No. | Chemical Structure |
|---|---|
| 19 | (structure) |
| 20 | (structure) |
| 21 | (structure) |
| 22 | (structure) |

TABLE 2

| Compound No. | Chemical Structure |
|---|---|
| 10 | (structure) |
| 11 | (structure) |
| 12 | (structure) |
| 13 | (structure) |

TABLE 2-continued

| Compound No. | Chemical Structure |
|---|---|
| 14 | (structure) |
| 15 | (structure) |
| 16 | (structure) |

TABLE 3

| Compound No. | Chemical Structure |
|---|---|
| 17 | (structure) |
| 18 | (structure) |
| 19 | (structure) |
| 20 | (structure) |
| 21 | (structure) |

TABLE 3-continued

| Compound No. | Chemical Structure |
|---|---|
| 22 |  |

The compound represented by the formula (1) can be obtained using the production methods disclosed in U.S. Pat. No. 4,950,768, Japanese Patent Publication No. 5-44946, German Patent No. 2509738, German Patent No. 2233859, etc.

An electrolyte further comprising a sultone compound represented by the formula (2) in addition to the cyclic disulfonic acid ester can also be used.

(2)

In the formula (2), n represents an integer of 0 to 2; and $R_1$ to $R_6$ each independently represent a hydrogen atom, an alkyl group having 1 to 12 carbon atoms, a cycloalkyl group having 3 to 6 carbon atoms, or an aryl group having 6 to 12 carbon atoms.

The combined effect of adding a compound which has a sulfonyl group represented by the formula (2) to the electrolyte in addition to the compound represented by the formula (1) enables to enhance the effects of improving the stability of the coating film, suppressing the decomposition of the solvent molecules, removing the moisture, and suppressing the generation of gas.

Examples of the compound represented by the formula (2) specifically include 1,3-propanesultone and 1,4-butanesultone (Japanese Patent Laid-Open Nos. 62-100948, 63-102173, 11-339850, and 2000-3724), alkane sulfonic acid anhydrides (Japanese Patent Laid-Open No. 10-189041), 1,3,2-dioxaphosphorane-2-oxide derivatives (Japanese Patent Laid-Open No. 10-50342), γ-sultone compounds (Japanese Patent Laid-Open No. 2000-235866), sulfolene derivatives (Japanese Patent Laid-Open No. 2000-294278), etc. but are not limited to these.

When the sulfonyl compound represented by the formula (2) is further added to the electrolyte in addition to the compound represented by the formula (1), the compound represented by the formula (2) can be added so that it may be, for example, 0.005 wt % to 10 wt % in the electrolyte. By adding 0.005 wt % or more, a coating film can be more effectively formed on the anode surface. More preferably, it can be 0.01 wt % or more. By adding 10 wt % or less, the solubility of the sulfonyl compound is suitably maintained and increase in viscosity of the electrolyte can be controlled. More preferably, it can be 5 wt % or less.

The electrolyte can be obtained by suitably dissolving and dispersing the compound represented by the formula (1) and, if needed, the compound which has the sulfonyl group represented by the formula (2) and further a lithium salt and other additives to the aprotic solvent. Since the coating film having different properties can be made to form on the anode surface by mixing the additives having different properties such as the compound represented by the formula (1) and the compound represented the formula (2), it is effective in improvement in the battery properties.

The electrolyte can be a composition which further contains a lithium salt as an electrolyte. By doing this, lithium ion can be used as a transfer substance and the battery properties can be improved. The composition may be one which contains, for example, one or more substances selected from a lithium imide salt, $LiPF_6$, $LiBF_4$, $LiAsF_6$, $LiSbF_6$, $LiClO_4$, $LiAlCl_4$ and $LiN(C_nF_{2n+1}SO_2)(C_mF_{2m+1}SO_2)$ (n and m are a natural number here) as a lithium salt. Particularly, $LiPF_6$ or $LiBF_4$ is preferably used. By using these, the electrical conductivity of the lithium salt can be enhanced, and the cycle performance of the secondary battery can be further improved.

The electrolyte can contain as an aprotic solvent, one or more solvents selected from the group consisting of cyclic carbonates, linear carbonates, aliphatic carboxylic acid esters, γ-lactones, cyclic ethers, linear ethers and fluoride derivatives thereof.

Specifically, as the electrolyte can be used one solvent or two or more mixed solvents selected from cyclic carbonates such as propylene carbonate (PC), ethylene carbonate (EC), butylene carbonate (BC) and vinylene carbonate (VC); linear carbonates such as dimethyl carbonate (DMC), diethyl carbonate (DEC), ethyl methyl carbonate (EMC) and dipropyl carbonate (DPC); aliphatic carboxylic acid esters such as methyl formate, methyl acetate and ethyl propionate; γ-lactones such as γ-butyrolactone; linear ethers such as 1,2-ethoxyethane (DEE) and ethoxymethoxyethane (EME); cyclic ethers such as tetrahydrofuran and 2-methyltetrahydrofuran; and dimethyl sulfoxide, 1,3-dioxorane, formamide, acetamide, dimethylformamide, acetonitrile, propylnitrile, nitromethane, ethylmonoglyme, phosphoric acid triester, trimethoxymethane, dioxolane derivatives, sulforane, methylsulforane, 1,3-dimethyl-2-imidazolidinone, 3-methyl-2-oxazolidinone, propylene carbonate derivatives, tetrahydrofuran derivatives, ethyl ether, N-methylpyrrolidone, fluorinated carboxylic acid esters, methyl-2,2,2-trifluoroethyl carbonate, methyl-2,2,3,3,3-pentafluoropropyl carbonate, trifluoromethyl ethylene carbonate, monofluoromethyl ethylene carbonate, difluoromethyl ethylene carbonate, 4,5-difluoro-1,3-dioxolan-2-one, monofluoroethylene carbonate, etc.

As the anode active material, for example, one substance or two or more substances selected from the group consisting of lithium metal, lithium alloys and materials which can occlude and release lithium can be used. As materials which can occlude and release lithium ions, carbon materials can be used.

As a carbon material, graphite, amorphous carbon, diamond-like carbon, carbon nanotube, etc. which can occlude lithium, or composite oxides of these can be used. Among these, graphite material or amorphous carbon is particularly preferable. Particularly, graphite material is preferable since it has a high electronic conductivity, excellent adhesiveness with a current collector which consists of a metal such as copper and voltage flatness and because it is formed at a high processing temperature, content of impurities is low, which works advantageously for improving the function of the anode.

The anode can be fabricated by dispersing and mixing these active materials with an electro-conductive material (electro-conductivity imparting material) such as carbon black and a binder such as polyvinylidene fluoride (PVDF) in a solvent such as N-methyl-2-pyrrolidone (NMP), if necessary, followed by applying the mixture on a substrate (anode current collector) such as a copper foil.

Examples of cathode active material include lithium-containing composite oxides such as $LiCoO_2$, $LiNiO_2$ and $LiMn_2O_4$, and those in which the transition metal portion of these lithium-containing composite oxides is substituted with other elements also may be used.

In addition, lithium-containing composite oxides having a plateau at 4.5 V or more in the potential with metal lithium counter electrode can be used for cathode active material. As the lithium-containing composite oxide, a spinel-type lithium manganese composite oxide, an olivine-type lithium-containing composite oxide, an inverse-spinel-type lithium-containing composite oxide, etc. are illustrated. The lithium-containing composite oxide can be a compound represented by the formula (3).

$$Li_a(M_xMn_{2-x})O_4 \qquad (3)$$

In the formula (3), 0<x<2, 0<a<1.2, and M represents at least one selected from the group consisting of Ni, Co, Fe, Cr, Ti and Cu.

The cathode can be fabricated by dispersing and mixing these active materials with an electro-conductive material such as carbon black and a binder such as polyvinylidene fluoride (PVDF) in a solvent such as N-methyl-2-pyrrolidone (NMP), if necessary, followed by applying the mixture on a substrate (cathode current collector) such as an aluminum foil.

The secondary battery on which the coating film is formed on the anode can be fabricated by, after in dry air or in an inert gas atmosphere the anode and the cathode are laminated through a separator therebetween or the laminate is wound, accommodating it in a package such as a battery can or a flexible film made of a laminate having synthetic resin and a metal foil or the like, and immersing the separator in an electrolyte containing the compound represented by the formula (1), and sealing the package or charging after sealing. A porous film such as polyolefin including polypropylene and polyethylene, and fluorocarbon resin can be used as the separator.

The shape of the battery of the present invention is not particularly limited but may be for example circular cylinder, rectangular, laminated jacket type or coin-type.

EXAMPLES

Example 1

Fabrication of Battery

In the cathode, an aluminum foil having a thickness of 20 μm was used as a cathode current collector and $LiMn_2O_4$ was used as a cathode active material. The cathode active material and carbon black (electro-conductivity imparting material) were dispersed and mixed in N-methyl-2-pyrrolidone (solvent) which dissolved polyvinylidene fluoride (binder) to form a paste. This paste was applied and dried on the aluminum foil and thereby the cathode was obtained.

In the anode, a copper foil having a thickness of 10 μm was used as an anode current collector and amorphous carbon was used as an anode active material. The anode active material and carbon black (electro-conductivity imparting material) were dispersed and mixed in N-methyl-2-pyrrolidone (solvent) which dissolved polyvinylidene fluoride (binder) to form a paste. This paste was applied and dried on the copper foil thereby the anode was obtained.

As an electrolyte solution, a mixed solvent of PC and EC and DEC was used as a solvent (volume ratio: 20/20/60), 0.9 mol/L of $LiPF_6$ was dissolved as a supporting electrolyte and Compound No. 1 of the above-mentioned Table 1 was added so that it might be contained 0.1 mol/L in the electrolyte. And the anode and the cathode were laminated and wound through a separator consisting of polyethylene and a 18650 cylinder type (cylinder type with a diameter of 18 mm and a length of 65 mm) secondary battery was fabricated.

(Initial Charging and Discharging Conditions)

Constant current and voltage charge was performed for 10 hours at a temperature of 20° C. at a charging rate of 0.2 C and a charge termination voltage at 4.3 V, and constant current discharge by a discharging rate of 1 C and a discharge termination voltage of 2.5 V and after a 5-minute pause, constant current discharge by discharging rates of 0.5 C, 0.2 C and 0.1 C were repeated with a pause.

(Anode Surface Analysis)

The discharged cell was disassembled under argon atmosphere, and the anode was cut out and introduced into an XPS analyzer without exposing it with the atmosphere. The result obtained by XPS analysis is shown in the following Table 4.

(Storage Test)

Charge and discharge were first performed one time for each at room temperature. The charge at this time was a constant current and voltage charge by 1 C, and the discharge was a constant current discharge of 0.2 C, and the discharge capacity in this case was assumed as the initial capacity, and the resistance in that case was assumed as the initial resistance. Here, the cutoff potential on the discharge side was set to 2.5 V and the cutoff potential on the charge side to 4.3 V. After charged by 1 C at constant current and voltage, constant current discharge of 0.2 C to 50% DOD (discharge depth) was performed and constant current discharging by 1 C, 3 C and 7 C for 10 seconds and 10-minute pause were repeated, and the value of resistance was calculated from the relation of potential and current of charging and discharging for these 10 seconds.

Then, each battery was charged by constant current and voltage charge of 1 C to 4.3 V for 2.5 hours and after that discharge of 0.2 C to 50% DOD was performed and each battery was maintained at 45° C. in a thermostat for 84 days. After allowed to stand still, constant current discharge operation was performed again at room temperature and charge and discharge were again performed for one time, and subsequently the resistance measurement was performed on the same conditions as in the initial one while assuming the discharge capacity as a recovering. The results are shown in Table 4.

Example 2

A secondary battery was fabricated as in Example 1 except that Compound No. 2 shown in Table 1 was used in place of Compound No. 1. The results of XPS analysis of the anode and measurements of the properties of the battery as in Example 1 are shown in Table 4.

Comparative Example 1

A secondary battery was fabricated as in Example 1 except that Compound No. 1 was not added. The results of XPS analysis of the anode and measurements of the properties of the battery as in Example 1 are shown in Table 4.

Comparative Example 2

A secondary battery was fabricated as in Example 1 except that 1,3-propanesultone (hereinafter abbreviated as 1,3-PS in some cases.) was used in place of Compound No. 1. The results of XPS analysis of the anode and measurements of the properties of the battery as in Example 1 are shown in Table 4.

$LiPF_6$ was dissolved as a supporting electrolyte and Compound No. 1 of the above-mentioned Table 1 was added so that it might be contained 0.13 mol/L in the electrolyte. And the anode and the cathode were laminated and wound through a separator consisting of polyethylene and a 18650 cylinder type (cylinder type with a diameter of 18 mm and a length of 65 mm) secondary battery was fabricated.

(Initial Charging and Discharging Conditions)

It is the same as that of Example 1.

(Anode Surface Analysis)

XPS analysis was performed as in Example 1. The obtained results are shown in Table 5.

(Charging and Discharging Cycle Test)

Constant current and voltage charge was performed at a temperature of 20° C. by a charging rate of 1 C and a charge termination-voltage at 4.2 V, and constant current discharge by a discharging rate of 1 C and a discharge termination

TABLE 4

| | Compound represented by formula (1) or the like | Anode XPS (ratio of carbon concentration/ sulfur concentration) | Anode XPS (ratio of 162.9 to 164.0 eV sulfur concentration/ sulfur concentration) | Ratio of resistance increase (resistance after storage/ initial resistance) | Capacity recovering ratio (%) (recovered capacity after storage/ initial recovered capacity) |
|---|---|---|---|---|---|
| Ex. 1 | Compound No. 1 | 12.1 | 0.02 | 1.062 | 92.1 |
| Ex. 2 | Compound No. 2 | 13.4 | 0.05 | 1.100 | 92.2 |
| Comp. Ex. 1 | None | >312 | 0 | 1.195 | 89.8 |
| Comp. Ex. 2 | 1,3-PS | 25.8 | 0 | 1.306 | 90.9 |

It has been confirmed that as for batteries given in Examples 1 and 2, increase in resistance after storage is suppressed and the capacity recovering ratio is improved as compared with Comparative Examples 1 and 2.

Example 3

Fabrication of Battery

In the cathode, an aluminum foil having a thickness of 20 μm was used as a cathode current collector and $LiMn_2O_4$ was used as a cathode active material. The cathode active material and carbon black (electro-conductivity imparting material) were dispersed and mixed in N-methyl-2-pyrrolidone (solvent) which dissolved polyvinylidene fluoride (binder) to form a paste. This paste was applied and dried on the aluminum foil and thereby the cathode was obtained.

In the anode, a copper foil having a thickness of 10 μm was used as an anode current collector and graphite carbon was used as an anode active material. The anode active material and carbon black (electro-conductivity imparting material) were dispersed and mixed in N-methyl-2-pyrrolidone (solvent) which dissolved polyvinylidene fluoride (binder) to form a paste. This paste was applied and dried on the copper foil thereby the anode was obtained.

As an electrolyte solution, a mixed solvent of EC and DEC was used as a solvent (volume ratio: 30/70), 1.0 mol/L of voltage at 3.0 V. The capacity retention ratio (%) is the value obtained by dividing the discharge capacity (mAh) after 300 cycles by discharge capacity (mAh) of 10th cycle. The results obtained by the cycle test are shown in Table 5.

Example 4

A secondary battery was fabricated as in Example 3 except that Compound No. 2 shown in Table 1 was used in place of Compound No. 1. The results of XPS analysis of the anode and measurements of the properties of the battery as in Example 3 are shown in Table 5.

Comparative Example 3

A secondary battery was fabricated as in Example 3 except that Compound No. 1 was not added. The results of XPS analysis of the anode and measurements of the properties of the battery as in Example 3 are shown in Table 5.

Comparative Example 4

A secondary battery was fabricated as in Example 3 except that 1,3-propanesultone was used in place of Compound No. 1. The results of XPS analysis of the anode and measurements of the properties of the battery as in Example 3 are shown in Table 5.

TABLE 5

|  | Compound represented by formula (1) or the like | Anode XPS (ratio of carbon concentration/ sulfur concentration) | Anode XPS (ratio of 162.9 to 164.0 eV sulfur concentration/ sulfur concentration) | Capacity retention ratio (%) |
|---|---|---|---|---|
| Ex. 3 | Compound No. 1 | 10.2 | 0.03 | 76.2 |
| Ex. 4 | Compound No. 2 | 11.2 | 0.04 | 77.1 |
| Comp. Ex. 3 | None | >301 | 0 | 58.8 |
| Comp. Ex. 4 | 1,3-PS | 17.8 | 0 | 73.7 |

It has been confirmed that as for batteries given in Examples 3 and 4, capacity retention ratio after cycle test is improved, that is, the cycle performance are improved as compared with Comparative Examples 3 and 4.

Example 5

A secondary battery was fabricated as in Example 1 except that 1 wt % of 1,3-propanesultone was further added to the electrolyte. The properties of the battery were investigated as in Example 1. The results are shown in Table 6.

Example 6

A secondary battery was fabricated as in Example 5 except that Compound No. 2 shown in Table 1 was used in place of Compound No. 1. The results of XPS analysis of the anode and measurements of the properties of the battery as in Example 1 are shown in Table 6.

TABLE 6

|  | Compound represented by formula (1) or the like | Additive other than the left column | Anode XPS (ratio of carbon concentration/ sulfur concentration) | Anode XPS (ratio of 162.9 to 164.0 eV sulfur concentration/ sulfur concentration) | Ratio of resistance increase (resistance after storage/ initial resistance) | Capacity recovering ratio (%) (recovered capacity after storage/initial recovered capacity) |
|---|---|---|---|---|---|---|
| Ex. 5 | Compound No. 1 | 1,3-PS | 11.1 | 0.01 | 1.095 | 93.4 |
| Ex. 6 | Compound No. 2 | 1,3-PS | 11.6 | 0.03 | 1.113 | 92.4 |
| Ex. 1 | Compound No. 1 | None | 12.1 | 0.02 | 1.062 | 92.1 |
| Ex. 2 | Compound No. 2 | None | 13.4 | 0.05 | 1.100 | 92.2 |
| Comp. Ex. 1 | None | None | >312 | 0 | 1.195 | 89.8 |
| Comp. Ex. 2 | 1,3-PS | None | 25.8 | 0 | 1.306 | 90.9 |

It has been confirmed that as for batteries given in Examples 5 and 6, capacity recovering ratio is improved as compared with Examples 1 and 2 and Comparative Examples 1 and 2. This can be attributed to combined effect of the compound represented by the formula (1) and 1,3-PS used as additives.

INDUSTRIAL APPLICABILITY

The non-aqueous electrolyte secondary battery of the present invention is useful as power source in mobile phones, notebook computers, etc.

The invention claimed is:

1. A non-aqueous electrolyte secondary battery, comprising a substance having a peak from 162.9 to 164.0 eV by XPS analysis on the anode surface, wherein when peak division of the photoelectron spectrum is performed by XPS analysis on the anode surface, the ratio ($Cc/Cs$) between the carbon concentration Cc (atom %) and the sulfur concentration Cs (atom %) is 5 to 50, and the ratio ($Cs_{164}/Cs$) between the sulfur concentration Cs (atom %) and the concentration $Cs_{164}$ (atom %) of the substance having a peak from 162.9 to 164.0 eV is 0.001 to 0.2, and the substance having a peak from 162.9 to 164.0 eV comprises a decomposed substance of a compound represented by the formula (1):

(1)

wherein Q represents an oxygen atom, a methylene group, or a C—S single bond; A represents a substituted or unsubstituted alkylene group having 1 to 5 carbon atoms, a carbonyl group, a sulfinyl group, a substituted or unsubstituted fluoroalkylene group having 1 to 6 carbon atoms, or a divalent group having 2 to 6 carbon atoms in which a plurality of alkylene units, a plurality of fluoroalkylene units or an alkylene unit and a fluoroalkylene unit are bonded through an ether bond; and B represents a substituted or unsubstituted alkylene group, a substituted or unsubstituted fluoroalkylene group, or an oxygen atom.

2. The non-aqueous electrolyte secondary battery according to claim 1, wherein the electrolyte comprises an aprotic solvent and a cyclic disulfonic acid ester having at least two sulfonyl groups.

3. The non-aqueous electrolyte secondary battery according to claim 2, wherein the cyclic disulfonic acid ester is a compound represented by the formula (1):

(1)

wherein Q represents an oxygen atom, a methylene group, or a C—S single bond; A represents a substituted or unsubstituted alkylene group having 1 to 5 carbon atoms, a carbonyl group, a sulfinyl group, a substituted or unsubstituted fluoroalkylene group having 1 to 6 carbon atoms, or a divalent group having 2 to 6 carbon atoms in which a plurality of alkylene units, a plurality of fluoroalkylene units or an alkylene unit and a fluoroalkylene unit are bonded through an ether bond; and B represents a substituted or unsubstituted alkylene group, a substituted or unsubstituted fluoroalkylene group, or an oxygen atom.

4. The non-aqueous electrolyte secondary battery according to claim 2, wherein the electrolyte further comprises a sultone compound represented by the formula (2):

(2)

wherein n represents an integer of 0 to 2; and $R_1$ to $R_6$ each independently represent a hydrogen atom, an alkyl group having 1 to 12 carbon atoms, a cycloalkyl group having 3 to 6 carbon atoms, or an aryl group having 6 to 12 carbon atoms.

5. The non-aqueous electrolyte secondary battery according to claim 2, wherein the electrolyte comprises 0.001 mol/L to 0.5 mol/L of the cyclic disulfonic acid ester.

6. The non-aqueous electrolyte secondary battery according to claim 1, which comprises a lithium-containing composite oxide as a cathode active material.

7. The non-aqueous electrolyte secondary battery according to claim 1, which comprises as an anode active material at least one substance selected from the group consisting of a material which can occlude and release lithium, and a metal material and an oxide material which can form an alloy with lithium.

8. The non-aqueous electrolyte secondary battery according to claim 1, which comprises a carbon material as an anode active material.

9. The non-aqueous electrolyte secondary battery according to claim 8, wherein the carbon material is graphite.

10. The non-aqueous electrolyte secondary battery according to claim 8, wherein the carbon material is amorphous carbon.

* * * * *

UNITED STATES PATENT AND TRADEMARK OFFICE
CERTIFICATE OF CORRECTION

PATENT NO. : 7,662,519 B2
APPLICATION NO. : 10/557029
DATED : February 16, 2010
INVENTOR(S) : Kusachi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 784 days.

Signed and Sealed this

Thirtieth Day of November, 2010

David J. Kappos
*Director of the United States Patent and Trademark Office*